Figure 1:
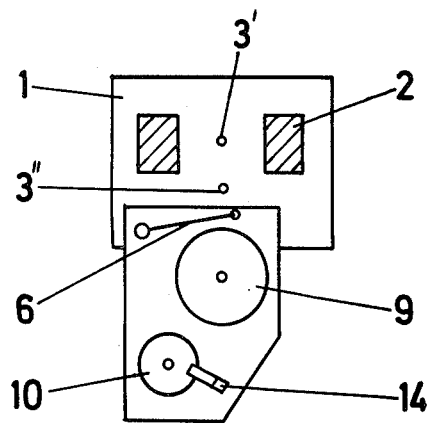

United States Patent [19]
Kaufeldt

[11] 3,918,593
[45] Nov. 11, 1975

[54] ARTICLE HANDLING AND TRANSFERRING MACHINE

[75] Inventor: Roland T. A. Kaufeldt, Nykoping, Sweden

[73] Assignee: Monark-Crescent AB, Varberg, Sweden

[22] Filed: Nov. 26, 1973

[21] Appl. No.: 419,086

[52] U.S. Cl. .............. 214/1 BH; 198/20 R; 198/34; 214/6 F
[51] Int. Cl.[2] .......................................... B65G 61/00
[58] Field of Search...... 214/1 BH, 1 B, 1 BC, 1 BS, 214/6 F; 198/25, 34 R, 29, 20 R

[56] References Cited
UNITED STATES PATENTS

| | | | |
|---|---|---|---|
| 2,988,237 | 6/1961 | Devol, Jr. ................. | 214/1 BC X |
| 3,283,918 | 11/1966 | Devol ....................... | 214/1 BC |
| 3,503,527 | 3/1970 | Devol ....................... | 214/1 Q |

FOREIGN PATENTS OR APPLICATIONS 227,985  7/1970  U.S.S.R. ........................... 214/1 BC

*Primary Examiner*—Frank E. Werner
*Attorney, Agent, or Firm*—Laff, Whitesel & Rockman

[57] ABSTRACT

A machine for handling and transferring articles comprises a rotative and vertically movable manipulator arm having a suction member at one end thereof for seizing an article ejected from a press and moving it to a delivery disc. This disc is moved in at least two directions by a programming means, e.g. being given a rotative movement and a radial movement or movements in x and y directions. This movement is effected between each delivery of an article to the disc.

8 Claims, 2 Drawing Figures

U.S. Patent  Nov. 11, 1975  3,918,593

ARTICLE HANDLING AND TRANSFERRING MACHINE

This invention refers to an article handling and transferring machine comprising a rotative and vertically movable manipulator arm having gripping means disposed at one end thereof for seizing each article at a pick-up station, retaining it, moving it to a delivery station, and releasing it there, in one and the same fixed position.

Pressing procedures may be used industrially to produce articles which are fragile and, therefore, must be handled with care. Such articles are, for instance, powder which is pressed into hard metal plates. After being so pressed, these plates are placed on a tray before they are further treated. Thereby, the plates are located on the tray in such a way that it is filled up as much as possible and thus tray space is utilized to a maximum degree. However, the plates must not be placed so that there are risks for them to damage each other. Hitherto this operation has been carried out manually. It is, however, very difficult to manage this work through manual handling due to the risk that the articles may be damaged by the worker and due to the cycle time, which is very short, so that it is not so easy to be able to complete the necessary operation within this time.

The main object of the present invention is to provide a machine for making this handling automatic.

According to the invention, the delivery station comprises a plate capable of moving in at least two directions, e.g. a rotative movement and a radial movement or movements in the $x$ and $y$ directions. Programming means are arranged to effect the movement of the plate between each delivery to it of an article.

Figure 2:
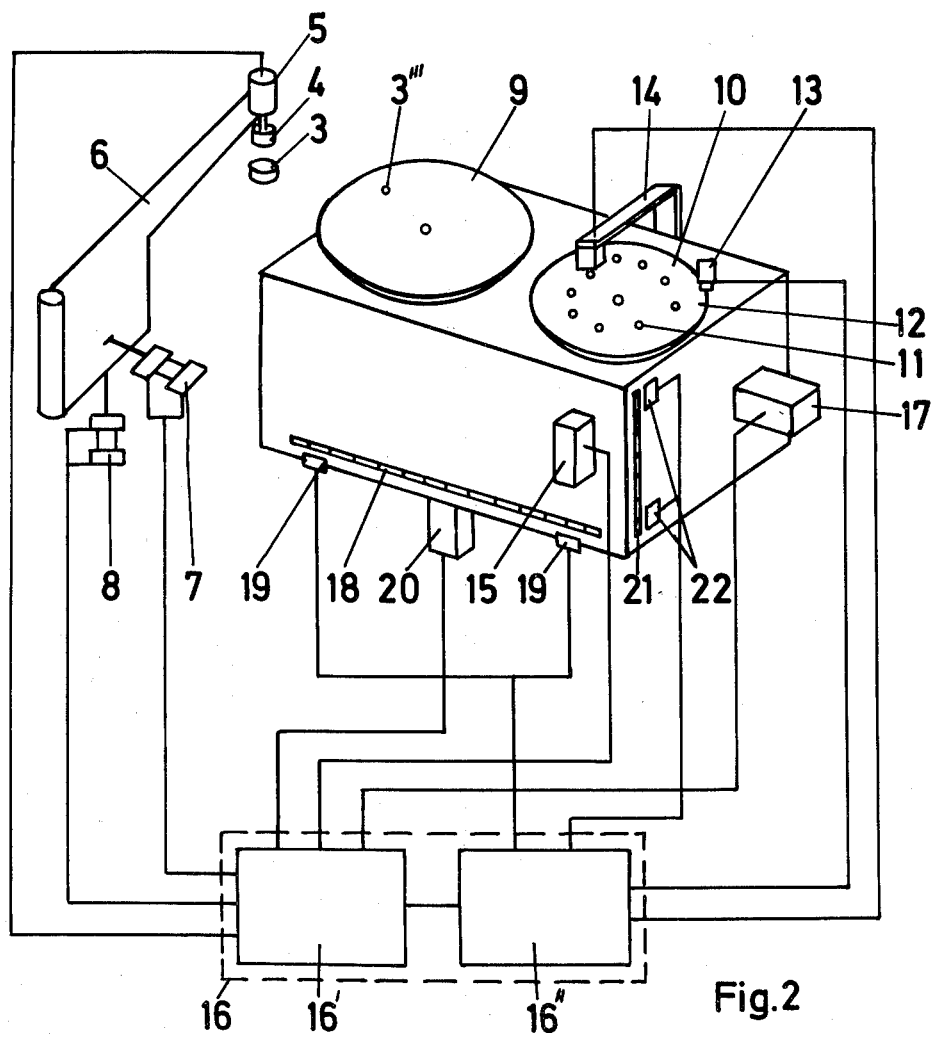

The invention will be described more specifically below in conjunction with the accompanying drawing, in which:

FIG. 1 shows a press unit connected a transfer machine, according to the invention, and FIG. 2 shows the principal structure of this machine.

In FIG. 1 is shown a press unit 1 comprising inter alia two pillars 2. In the press is machined an article 3, which when finished has the position 3'. The article is then ejected from the pressing tool and arrives at the position 3''. FIG. 1 also shows how a transferring machine, according to the invention, is connected to the press. The transfer machine moves the ejected article 3 from the press and places it upon a delivery disc 9, in accordance with a certain pattern.

The principal structure of the transfer machine is disclosed in FIG. 2. In greater detail, the machine comprises a frame plate provided with a rotary manipulator arm 6, which also is vertically movable. The rotary movement is effected by a pneumatic cylinder 7 and the vertical movement by a pneumatic cylinder 8. In the free outer end of the manipulator arm there is a suction member 4, connected to a pneumatic rotary cylinder 5. The suction member 4 seizes the article 3 in the press, when this article has been ejected to the position 3''. By means of the manipulator arm 6 the article 3 is raised and is then swung to a position, where it is located above the delivery disc 9. Thereafter the article is lowered, always to the same one and fixed position 3'''. Then the suction member 4 releases the article 3 and the manipulator arm 6 returns to its starting position. The movement of the arm 6 to its fixed position 3''' is controlled by the cylinders 7 and 8. The disc 9 is mounted on a vertical shaft, rotated by an air motor 15. To this motor is also connected a control disc 10, which moves in synchronism with the delivery disc 9.

On the control disc 10 there are both position markings 11 and a full circle marking 12. The position markings are located along a number of concentric circle lines. These markings correspond to those places of the delivery disc 9, where the articles 3 are to be positioned, so that the disc is filled up to a maximum degree.

The full circle marking 12 is placed on the periphery of the control disc 10 and each finished turn will be sensed by a sensing member 13. The position markings 11 are sensed by a sensing member 14, located in the outer end of a swingable holder arm. When a complete 360° turn of the discs 9, 10 is finished, and this completion is sensed by the member 13, another air motor 17 is actuated to displace the discs 9 and 10 radially, far enough so that next circle line with position markings (not shown) will be sensed by the member 14, this member 14 is located above this circle line due to a simultaneous turning of its holder arm.

When displacing the discs 9 and 10 radially, a sensing member 19 is also displaced, thereby moving along markings 18, which correspond to the concentric circle lines consisting of the position markings. Thus, the first marking 18 corresponds to the inner circle line and the last marking 18 corresponds to the outer circle line.

The air motors 15 and 17 and the pneumatic cylinders 5, 7 and 8 are controlled by solenoid valves, which are included in a pneumatic control unit 16'. The sensing members 13, 14 and 19 are included together in an electric control unit 16''. Both these units 16' and 16'' are brought together into one common control unit 16, to which only supply of pressurized air and electric current is needed.

When an article 3 is ejected from the press 1 to the position 3'', the manipulator arm 6 is swung inwardly towards the press. At the same time, it is lowered over the article. The suction member 4 seizes the article and the manipulator arm 6 is swung out from the press and is raised again. The suction member 4 is shaped in such a way that it is independent of the height of the article. The suction member, for example, can be in the form of a flexible rubber tube. The manipulator arm 6 is swung in over the delivery disc 9 which has been rotated to such a position that the article 3, after having been lowered onto the delivery disc and released there by the suction member will be placed onto the intended circle line and in correct position on this line. Due to the shape of the article, it might be necessary to turn it, for instance 90°, in order to fully utilize each concentric circle line for so storing as many articles as possible. For that purpose, the suction member is connected to a rotary cylinder 5.

After having released the article onto the delivery disc 9, the manipulator arm 6 is raised again and is swung back towards the press to seize next article. At the same time the discs 9 and 10 are rotated a required angle corresponding to next position on the actual circle line of the delivery disc. This position also corresponds to a specific marking 11 on the control disc 10, said marking being sensed by the member 14. When the actual circle line is filled with articles, corresponding to a full turn of the control disc 10, this is sensed by the member 13 which, responsive thereto, causes a radial displacement of the discs to positions corresponding to the next circle line. This displacement is, as mentioned before, controlled by the markings 18 and sensing members 19. Thereafter, in an analogical way, the next circle line is filled up with articles and the discs are displaced to the next circle line and so on. This operation goes on until all the circle lines are filled up with articles and the machine is stopped. The full delivery disc 9 is then removed from the machine and replaced by an empty disc, the transfer process thereafter being repeated.

It is also possible to utilize this machine to stack articles in several layers on the delivery disc 9. For this purpose the machine is provided with a third air motor 20, capable of displacing the discs 9 and 10 in axial direction. After the disc 9 has been filled up with articles in one layer, the discs are actuated by the motor 20 and lowered to a level where the manipulator arm 6 can place a further layer of articles onto the delivery disc 9. This axial displacement of the discs is controlled by markings 21 and sensing members 22. Thus each marking 21 correspond to the distance between two layers on the disc 9. The air motor 20 is connected to solenoid valves included in the pneumatic control unit 16' and the markings 21 and sensing members 22 are connected to the electric control unit 16''.

The air motors used are provided with viscous dampers giving the possibility to infinitely vary the speed of the motors and at the same time giving the rotary movements of the discs a progressive damping. The position markings on the control disc 10 can be of mechanical type, e.g. in the form of metal pins located in intended positions on the disc. These pins then actuate the sensing member 14, which may consist of an electrical switch. The full circle marking 12 can also consist of a mechanical device actuating an electrical switch included in the sensing member 13. In the same way the markings 18 and 21 respectively can consist of mechanical devices actuating electrical switches included, in the sensing members 19 and 22 respectively. For the markings and the sensing members can be used also other types of devices, e.g. magnetic and electrical ones.

The arm 6 moves from the press to a definite, constant position, where its suction member 4 delivers the article. This arm movement and the rotation of the delivery disc from one position to the next, its movement in radial direction from one circle line to the next and eventually its movement in axial direction from one layer to the next, all these movements are controlled by the electrical control unit included in the control unit 16, which control means function according to a certain program. This program can be varied in dependence of the article to be handled, how that article is shaped, if it shall be stacked in several layers and so on.

In the machine described here, the delivery disc or plate has circular form. It is, however, possible to give this plate another geometrical shape, e.g. rectangular form. In such a type of plate first a row in the x direction is filled and then the plate is displaced one step in y direction, so that next row in the x direction can be filled with articles. If more than one layer on the plate is wanted, after that the first layer has been filled up, the plate is displaced one step in z direction and next layer is filled up through displacement of the plate in x and y directions.

The machine described above provides for an automatic device which rapidly and without damaging the articles moves them from the press unit and places them on the delivery disc, so that this is filled to a maximum degree. The cycle time is in the magnitude of 2 seconds. The control system for the machine is independent of the total number of articles to be placed on the delivery disc and also independent of the form of the article to be transferred. The invention is not limited to the embodiment described here above, but can be varied in different aspects within the scope of the invention. Thus it is possible to control the movements of the delivery disc 9 in a pantographic way.

I claim:

1. An article handling and transferring machine comprising a movable manipulator arm means movable in only rotative and vertical directions, gripping means disposed at one end of said arm means for seizing and holding the article at a pick-up station, means for moving said arm to a delivery station and releasing said gripping means there to always deliver said article in one and the same fixed geometrical position, said delivery station comprising a horizontal rotatable delivery plate, means for supporting said rotatable plate for moving said rotatable plate in at least two directions under said fixed position, one of said two directions being a rotational direction and the other direction being a radial linear direction, and programming means comprising a horizontal rotatable plate indexed for causing an incremental movement of said delivery plate between each delivery of an article to it.

2. An article handling and transferring machine comprising a rotative and vertically movable manipulator arm means, gripping means disposed at one end of said arm means for seizing and holding the article at a pick-up station, means for moving said arm to a delivery station and releasing said gripping means there to always deliver said article in one and the same fixed geometrical position, said delivery station comprising a horizontally extending delivery plate, means for supporting said plate for motion in two different horizontal directions under said fixed position, one of said horizontal motions being a linear motion and the second of said horizontal motions being a motion directed transversely to said first motion, both of said motions moving said plate under said fixed geometrical position, and programming means comprising a horizontally extending control plate indexed in a manner similar to the desired incremental movement of said delivery plate for causing such movement of the delivery plate between each delivery of an article to it, whereby said delivery plate may experience said motions in the two different horizontal directions.

3. A machine as claimed in claim 2, wherein said two directions are a rotary movement and a radial movement.

4. A machine as claimed in claim 2, wherein said two directions are rectilinear in x and y directions.

5. A machine as claimed in claim 2, wherein the programming means include a control plate having the same shape as the delivery plate, means for causing said control plate to perform movements in one place synchronous to the movements of the delivery plate in the same plane, means on the control plate for indicating position markings corresponding to the positions where the articles are placed on the delivery plate and with end markings for indicating the beginnings and ends of the respective movements of the control plate, and the programming means also include sensing means for sensing said position markings and end markings and actuating means controlled by the sensing means for actuating the movements of the delivery plate, the control plate, and the manipulator arm.

6. A machine as claimed in claim 5, and means for moving the delivery plate and the control plate in a further direction perpendicular to said one plane, and means associated with the programming means and also include marking means and sensing means for control of this perpendicular movement.

7. A machine as claimed in claims 5 and air motor means for causing said movements of said plates, said motors being provided with progressive dampers.

8. The machine of claim 2 wherein said delivery plate is mounted for rotation in said second motion.

* * * * *